(12) United States Patent
Hessling-Von Heimendahl et al.

(10) Patent No.: US 10,362,657 B2
(45) Date of Patent: Jul. 23, 2019

(54) EXTERIOR AIRCRAFT LIGHT UNIT AND AIRCRAFT COMPRISING THE SAME

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE); Robert Trinschek, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/380,612

(22) Filed: Dec. 15, 2016

(65) Prior Publication Data

US 2017/0181246 A1 Jun. 22, 2017

(30) Foreign Application Priority Data

Dec. 17, 2015 (EP) .................................... 15200651

(51) Int. Cl.
| | | |
|---|---|---|
| *F21V 7/00* | (2006.01) | |
| *B64D 47/02* | (2006.01) | |
| *F21V 13/04* | (2006.01) | |
| *F21V 17/06* | (2006.01) | |
| *H05B 33/08* | (2006.01) | |

(Continued)

(52) U.S. Cl.
CPC ......... *H05B 33/0893* (2013.01); *B64D 47/02* (2013.01); *F21V 7/0091* (2013.01); *F21V 13/04* (2013.01); *F21V 17/06* (2013.01); *B64D 2203/00* (2013.01); *F21W 2107/30* (2018.01); *F21Y 2115/10* (2016.08)

(58) Field of Classification Search
CPC ... F21V 7/0091; H05B 33/0893; B64D 47/02; B64D 2203/00; G01J 1/0411; G01J 1/0422
See application file for complete search history.

(56) References Cited

U.S. PATENT DOCUMENTS

| | | |
|---|---|---|
| 6,707,435 B1 | 3/2004 | Merlato et al. |
| 7,950,832 B2 * | 5/2011 | Tanaka ...................... F21V 5/04 |
| | | 362/311.02 |

(Continued)

FOREIGN PATENT DOCUMENTS

| | | |
|---|---|---|
| EP | 1156271 A1 | 11/2001 |
| EP | 1410949 A2 | 4/2004 |

(Continued)

OTHER PUBLICATIONS

European Search Report for Application No. 15200651.6-1754; dated Jun. 6, 2016; 8 pages.

*Primary Examiner* — Alexander K Garlen
(74) *Attorney, Agent, or Firm* — Cantor Colburn LLP

(57) ABSTRACT

An exterior aircraft light unit includes a support plate, an LED, mounted to the support plate, a near end of life detector for sensing a light output level of the LED, the near end of life detector being mounted to the support plate, and a transparent optical element for shaping an output light intensity distribution of the exterior aircraft light unit, wherein the transparent optical element jointly encases the LED and the near end of life detector, with light from the LED reaching the near end of life detector through the transparent optical element.

18 Claims, 3 Drawing Sheets

(51) Int. Cl.
*F21W 107/30* (2018.01)
*F21Y 115/10* (2016.01)

(56) References Cited

U.S. PATENT DOCUMENTS

| | | | | |
|---|---|---|---|---|
| 2003/0116773 | A1* | 6/2003 | Kraus | H01L 31/12 257/88 |
| 2006/0249663 | A1* | 11/2006 | Ewig | B60Q 1/00 250/221 |
| 2008/0093530 | A1* | 4/2008 | Hoelen | G01J 1/04 250/201.1 |
| 2008/0290353 | A1* | 11/2008 | Medendorp, Jr. | H01L 25/167 257/89 |
| 2009/0206758 | A1* | 8/2009 | Kobilke | F21K 9/00 315/113 |
| 2009/0212709 | A1* | 8/2009 | Meijer | F21S 10/02 315/153 |
| 2010/0052542 | A1* | 3/2010 | Siemiet | G01J 1/32 315/129 |
| 2014/0233241 | A1* | 8/2014 | Kasper | G02B 6/4286 362/296.04 |
| 2016/0282283 | A1* | 9/2016 | Hessling-Von Heimendahl | B64D 45/00 |
| 2016/0341655 | A1* | 11/2016 | Jha | F21V 5/045 |

FOREIGN PATENT DOCUMENTS

| | | | |
|---|---|---|---|
| EP | 1679469 | A1 | 7/2006 |
| EP | 2579682 | A1 | 4/2013 |
| EP | 2663162 | A1 | 11/2013 |
| EP | 2886941 | A1 | 6/2015 |
| WO | 0027699 | A2 | 5/2000 |

* cited by examiner

EXTERIOR AIRCRAFT LIGHT UNIT AND AIRCRAFT COMPRISING THE SAME

FOREIGN PRIORITY

This application claims priority to European Patent Application No. 15200651.6 filed Dec. 17, 2015, the entire contents of which is incorporated herein by reference.

TECHNICAL FIELD

The present invention relates to exterior aircraft lighting. In particular, it relates to exterior aircraft light units that have a near end of life detector.

BACKGROUND

Almost all aircraft are equipped with exterior light units. In particular, large passenger air planes are provided with a wide variety of exterior light units. The exterior light units are provided for a wide variety of different purposes, such as for allowing the passengers and/or air crew to view the outside, for passive visibility, for signalling purposes, etc. Examples of such exterior light units are navigation lights, also referred to as position lights, beacon lights, anti-collision lights, wing scan lights, landing lights, taxi lights, runway turn-off lights, etc.

Exterior aircraft light units are exposed to very hazardous conditions. They have to withstand large aerodynamic forces as well as large temperature variations. In particular, both very low temperatures, due to the high cruising altitude, as well as very high temperatures, due to turbine exhaust, may potentially be present in the environment of exterior aircraft light units. Operation at extreme temperatures may be detrimental to the aging of LEDs, employed in modern exterior aircraft light units.

In order to observe the aging of the employed LEDs, some exterior aircraft light units are equipped with sensors for determining a light output level of the employed LED(s). This observation of the light output level is often also referred to as near end of life detection, because such light units generate a near end of life signal, indicating that the LED(s) has/have reached or is/are soon to reach their maximum life time. As a response to this signal, the light sources of the exterior aircraft light units or the entire exterior aircraft light units may be replaced. Near end of life detection requires some of the light, emitted by the light source(s), to not contribute to the amount of light that exits the exterior aircraft light unit and forms the output light intensity distribution. Prior art exterior aircraft light units are not satisfactory in terms of the inclusion of the near end of life detector.

Accordingly, it would be beneficial to provide an exterior aircraft light unit with an improved inclusion of a near end of life detector. Further, it would be beneficial to provide an aircraft with such an exterior aircraft light unit.

SUMMARY

Exemplary embodiments of the invention include an exterior aircraft light unit, comprising a support plate, an LED, mounted to the support plate, a near end of life detector for sensing a light output level of the LED, the near end of life detector being mounted to the support plate, and a transparent optical element for shaping an output light intensity distribution of the exterior aircraft light unit, wherein the transparent optical element jointly encases the LED and the near end of life detector, with light from the LED reaching the near end of life detector through the transparent optical element.

Exemplary embodiments of the invention allow for the using of the transparent optical element for directing light from the LED towards the near end of life detector. In this way, one optical structure, namely the transparent optical element, may be used both for shaping the output light intensity distribution of the exterior aircraft light unit and for directing light towards the near end of life detector. Such a double usage of the transparent optical element may eliminate the need for separate re-directing elements, such as reflectors, as have been used in previous approaches for directing the light towards the near end of life detector.

For ensuring that light from the LED travels through the transparent optical element on its way to the near end of life detector, the transparent optical element may extend into the path between the LED and the near end of life detector. In particular, the transparent optical element may not be a dome-like structure forming an umbrella-like structure over the LED and the near end of life detector. Instead, the transparent optical element may be a substantially solid element. In particular, the transparent optical element may have a substantial solid extension in the dimension perpendicular to the support plate. More in particular, the transparent optical element may have, at its thickest position, an extension in the dimension perpendicular to the support plate that is between 20% and 120% in particular between 30% and 60%, of the largest extension of the transparent optical element in the dimension parallel to the support plate.

The transparent optical element jointly encases the LED and the near end of life detector. In other words, the transparent optical element forms a common casing around the LED and the near end of life detector. The transparent optical element and the support plate form a casing that leaves room for the LED and the near end of life detector. The term encasing the LED and the near end of life detector means that the transparent optical element and the support plate do not form an ample interior space, wherein the LED and the near end of life detector are arranged, but that the space between the transparent optical element and the support plate is similar in dimension to the volume of the LED and the near end of life detector. E.g., the space between the transparent optical element and the support plate may be at most 150%, in particular at most 120%, of the volume of the LED and the near end of life detector. The transparent optical element encasing the LED and the near end of life detector thus provides for a highly stable optical structure of the exterior aircraft light unit and for an overall highly stable exterior aircraft light unit.

The support plate may be a printed circuit board, onto which the LED and the near end of life detector are mounted with their respective electrical connections. The transparent optical element may also be referred to as a lens element, as its refracting properties shape the output light intensity distribution of the exterior aircraft light unit. It is further pointed out that a plurality of LEDs may be provided in the exterior aircraft light unit and may be encased together with the near end of life detector by the transparent optical element. The number and intensity of the LED(s) may depend on the particular application of the exterior aircraft light unit.

The near end of life detector may be any kind of device that is capable of sensing a light output level of the LED. In particular, the near end of life detector may be a photo detector. This photo detector may output a signal indicative of the light output level to a separate control unit. However, it is also possible that the photo detector is provided with embedded control electronics, such as a comparator for comparing the sensed light output level with a light output level threshold. The embedded control electronics may then further be capable of providing an alarm signal if the sensed light output level is below the light output level threshold. An alarm signal may be a visual alarm signal, such as a near end of life indicating LED, or may be a signal transmitted to an external control unit. It is also possible that the alarm signal controls the exterior aircraft light unit to enter a near end of life indicating mode, such as a flashing mode of operation or an increased frequency flashing mode of operation.

According to a further embodiment the transparent optical element has, at least in a first cross-sectional plane, a total internal reflection portion, with light from the LED reaching the near end of life detector via total internal reflection at the total internal reflection portion. The total internal reflection portion of the transparent optical element is an outside surface thereof. Light that travels within the transparent optical element and reaches the total internal reflection portion does not exit the transparent optical element to the outside, but is reflected internally within the transparent optical element and, subsequently, reaches the near end of life detector. In particular, the total internal reflection portion has a geometric shape that is configured and arranged with respect to the LED in such a way that it provides for total internal reflection of the light coming from the LED. In this way, the phenomenon of total internal reflection may be used for achieving a re-directing of a portion of the light from the LED towards the near end of life detector without any additional reflectors or other re-directing optical elements.

According to a further embodiment, the near end of life detector faces away from the support plate. In particular, the light sensing portion of the near end of life detector faces away from the support plate. In this way, a convenient, stable and easily releasable mounting of the near end of life detector to the support plate, in particular to a printed circuit board, can be achieved. In this way, the facing direction of the near end of life detector and the main light emission direction of the LED may both be perpendicular to the support plate, with the total internal reflection at the total internal reflection portion of the transparent optical element achieving an effective re-directing of some light of the LED towards the near end of life detector.

According to a further embodiment, the total internal reflection portion is a planar surface, forming a line in the first cross-sectional plane. A planar surface is a conveniently realizable geometric structure that allows for total internal reflection over an extended area in a well-controlled manner. According to a particular embodiment, the total internal reflection portion has an angle of between 10° and 30° with respect to the support plate in the first cross-sectional plane. In particular, the angle of the total internal reflection portion with respect to the support plate in the first cross-sectional plane may be between 20° and 28°. Providing the total internal reflection portion at an angle within said range allows for providing an extended surface of total internal reflection, while at the same time keeping the transparent optical element compact in size.

According to an alternative embodiment the total internal reflection portion is a convex surface, when seen from outside the exterior aircraft light unit. In particular, the total internal reflection portion may be convex at least in the first cross-sectional plane. With such a convex surface, the light from the LED, reflected by the total internal reflection portion, may be concentrated to a higher degree towards the near end of life detector and/or a smaller near end of life detector may be used due to the light concentration towards it.

According to a further embodiment, the total internal reflection portion is located within an angular range of between 60° and 90° with respect to a main light emission direction of the LED in the first cross-sectional plane, the main light emission direction of the LED being substantially orthogonal to the support plate. In particular, the total internal reflection portion may be located within an angular range of between 70° and 90° with respect to the main light emission direction of the LED. The total internal reflection portion being located within the given angular ranges does not mean that the total internal reflection portion has to cover the entire given angular range in the first cross-sectional plane. While this is possible, the total internal reflection portion can also extend over a part of the given angular ranges. With the given angular ranges, the total internal reflection portion is in an ambient light emission direction of the exterior aircraft light unit. With regulatory requirements and/or desired behaviors of the output light intensity distributions of exterior aircraft light units often mandating a sharp drop in the output light intensity for ambient light emission directions, placing the total internal reflection portion in the ambient light emission direction allows for achieving the described drop in light intensity as well as redirecting a good amount of light from the LED towards the near end of life detector for reliably detecting the light output level of the LED. Accordingly, reliable detection of a near end of life condition being present or not can be combined with achieving desired/required light intensity drops in the output light intensity distribution of the exterior aircraft light unit in a very convenient manner.

According to a further embodiment, the first cross-sectional plane is a horizontal cross-sectional plane through the exterior aircraft light unit. In particular, the first cross-sectional plane may be a horizontal cross-sectional plane trough the exterior aircraft light unit that runs through the LED and the near end of life detector. The term horizontal cross-sectional plane relates to the orientation of the exterior aircraft light unit, when assembled in the aircraft. Accordingly, the LED and the near end of life detector may be arranged at the same or a similar height with respect to ground, when the exterior aircraft light unit is mounted to an aircraft.

According to a further embodiment, the transparent optical element has a refractive outer surface portion for shaping the output light intensity distribution of the exterior aircraft light unit. In this way, the transparent optical element may act as a lens, transforming the output light intensity distribution of the LED into a required and/or desired output light intensity distribution of the exterior aircraft light unit. In particular, the outer surface of the transparent optical element may consist of the refractive outer surface portion and the total internal reflection portion, as described above. In this way, the light from the LED is partly refracted by the outer surface of the transparent optical element for contributing to a desired/required output light intensity distribution and partly reflected towards the near end of life detector for ensuring a reliable near end of life detection.

According to a further embodiment the LED has a main light emission direction substantially orthogonal to the support plate. The refractive outer surface portion may extend, in a first cross-sectional plane, around the main light emission direction of the LED and may be adjacent to at least one total internal reflection portion located on at least one side of the refractive outer surface portion, and/or the refractive outer surface portion may extend, in a second cross-sectional plane, in an angular range of between −80° to 80°, in particular of between −90° and 90°, with respect to the main light emission direction of the LED. In a particular embodiments, the refractive outer surface portion may be adjacent to two total internal reflection portions, located on two sides of the refractive outer surface portion, in the first cross-sectional plane. In this way, the refractive outer surface portion may extend over a very large portion of the exterior aircraft light unit, ensuring high optical efficiency of the exterior aircraft light unit by using a very large portion of the light from the LED for the output light intensity distribution. It may also be ensured that the amount of light used for near end of life detection is kept low and that, in particular, only light from certain cross-sectional planes is used for near end of life detection. It is possible to selectively use light for near end of life detection in those cross-sectional planes where the light can be dispensed with comparably easily in view of the required/desired output light intensity distribution. Again, the first cross-sectional plane may be a horizontal cross-sectional plane, when the exterior aircraft light unit is mounted to an aircraft. The second cross-sectional plane may be a vertical cross-sectional plane, when the exterior aircraft light unit is mounted to an aircraft. It is pointed out that all aspects of the total internal reflection portion, as described above, also apply in the present context.

According to a further embodiment, the transparent optical element solidly reaches to the support plate around the LED and around the near end of life detector. In particular, the transparent optical element may reach to the support plate in between the LED and the near end of life detector. By fully surrounding both the LED and the near end of life detector as a solid structure, the transparent optical element is shaped to provide an immediate travel path for the light from the LED, which exits the LED roughly in the direction of the near end of life detector, towards the near end of life detector. With the transparent optical element surrounding the LED, all light emitted by the LED may be subject to the refracting/reflecting properties of the transparent optical element. The transparent optical element reaching to the support plate refers to a direct or immediate contact between the transparent optical element and the support plate. With the transparent optical element solidly reaching to the support plate around the LED and around the near end of life detector, the transparent optical element is a solid structure forming a strong and stable casing around the LED and the near end of life detector.

According to a further embodiment, the transparent optical element is overmolded over the LED and the near end of life detector onto the support plate. Overmolding the transparent optical element onto the support plate is an efficient means for producing the transparent optical element, while ensuring a tight encasing of the LED and the near end of life detector by the transparent optical element.

According to a further embodiment, the transparent optical element may be made from silicone. The silicone of the transparent optical element may have a refractive index of about 1.4. Overmolding the LED with a transparent optical element made from silicone may allow for eliminating losses due to Fresnel reflections at the interface between the LED and the transparent optical element.

According to a further embodiment, the transparent optical element is in direct contact with at least one of the LED and the near end of life detector. In particular, the transparent optical element may be in direct contact with both the LED and the near end of life detector. In other words, the transparent optical element may abut at least one of the LED and the near end of life detector. In yet other words, it is possible that no air gap is present between the transparent optical element and one or both of the LED and the near end of life detector. By eliminating the air gap between the transparent optical element and the LED, the number of material discontinuities in the travel path of the light is reduced, thus minimising the losses along the way. The same reasoning holds true for the interface between the transparent optical element and the near end of life detector.

The LED may be a semi conductor light emitting diode covered by a silicone or plastic cover, as is common in the art. By providing the transparent optical element in direct contact with the plastic/silicone covered LED, for example by overmolding a transparent optical element from silicone over the plastic/silicone covered LED, the losses at the interface may be eliminated or kept very small. This is for example because the silicone of the transparent optical element may have a very similar or identical refractive index, as compared to the plastic/silicone cover of the LED.

According to a further embodiment, the exterior aircraft light unit is free of shutters. In particular, it is possible that the light from the LED is partly used for shaping the output light intensity distribution of the exterior aircraft light unit and partly for performing the near end of life detection via the near end of life detector. By re-directing light towards the near end of life detector, this light is purposefully used, but does not contribute to the output light intensity distribution in undesired angular ranges, where shutters were used for blocking the light in previous approaches. It is pointed out that some absorption of light around the near end of life detector by the support plate is possible, without greatly hurting the overall efficiency of the exterior aircraft light unit.

According to a further embodiment, the exterior aircraft light unit is one of a navigation light unit, an anti-collision light unit, and a beacon light unit. The navigation light unit may also be referred to as a position light unit. In a particular embodiment, the exterior aircraft light unit may be a tail navigation light unit, which may be mounted to a tail portion of an air plane, such as below the exhaust of an auxiliary power unit.

Exemplary embodiments of the invention further include an aircraft, such as an air plane or a helicopter, comprising at least one exterior aircraft light unit, as described in any of the embodiments above. In particular, the aircraft may comprise an exterior aircraft light unit, as described in any of the embodiments above, as a tail navigation light unit that is installed at a tail portion of the aircraft. The additional features, modifications, and benefits, described above with respect to the exterior aircraft light unit, are equally applicable to the aircraft as a whole.

BRIEF DESCRIPTION OF THE DRAWINGS

Further embodiments of the invention are described in detail below with reference to the Figures, wherein.

DETAILED DESCRIPTION

Figure 1:
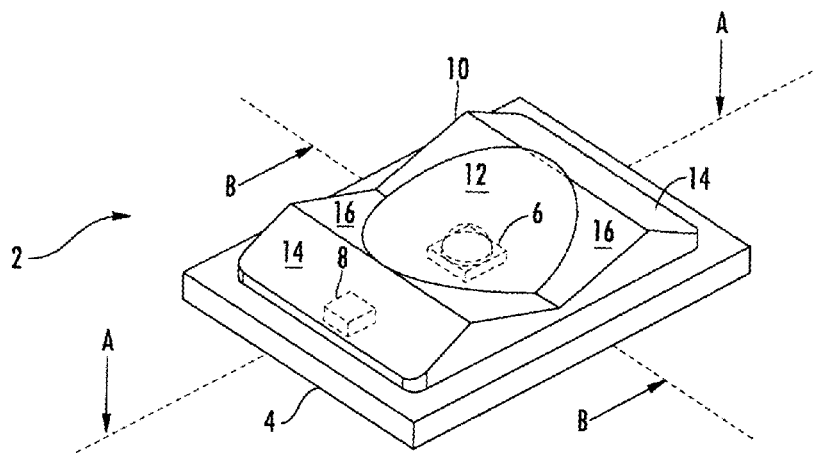
FIG. 1 shows an exterior aircraft light unit in accordance with an exemplary embodiment of the invention in a perspective view.

FIG. 1 shows an exterior aircraft light unit 2 in accordance with exemplary embodiments of the invention in a perspective view. The exterior aircraft light unit 2 may be mounted to an aircraft, such as an air plane or a helicopter, in various positions. For example, the exterior aircraft light unit 2 may be mounted to a tail or to a wing tip of an air plane.

The exterior aircraft light unit 2 comprises a support plate 4, to which an LED 6 and a near end of life detector 8 are mounted. The LED 6 is mounted substantially at the center of the support plate 4. The near end of life detector 8 is spaced from the LED 6 along an axis A-A. The axis A-A is a horizontal axis of the exterior aircraft light unit, when assembled to the exterior of an aircraft.

The exterior aircraft light unit 2 further comprises a transparent optical element 10, made from silicone. The transparent optical element 10 is overmolded over the LED 6 and the near end of life detector 8. The transparent optical element 10 covers and tightly encases the LED 6 and the near end of life detector 8 with respect to the support plate 4. As the LED 6 and the near end of life detector 8 are covered by and not accessible through the transparent optical element 10, they are depicted in phantom lines in FIG. 1. The silicone of the transparent optical element 10 has a refractive index of about 1.4 in the exemplary embodiment of FIG. 1.

The transparent optical element 10 comprises a refractive outer surface portion 12, two total internal reflection portions 14, and two connecting portions 16. These portions jointly form the outer surface of the transparent optical element 10 facing away from the support plate 4. The geometries of the refractive outer surface portion 12 and the total internal reflection portions 14 will be described in detail below with respect to FIGS. 2 and 3. The connection portions 16 have minor influence on the optical behaviour of the exterior aircraft light unit 2 and are mainly provided for forming a continuous outer surface of the transparent optical element 10 around and between the refractive outer surface portion 12 and the total internal refraction portions 14. The transparent optical element 10 is symmetrical with respect to an axis B-B, which runs through the LED 6 and is substantially perpendicular to the axis A-A. When mounted to the aircraft, the axis B-B is a vertical axis.

Figure 2:
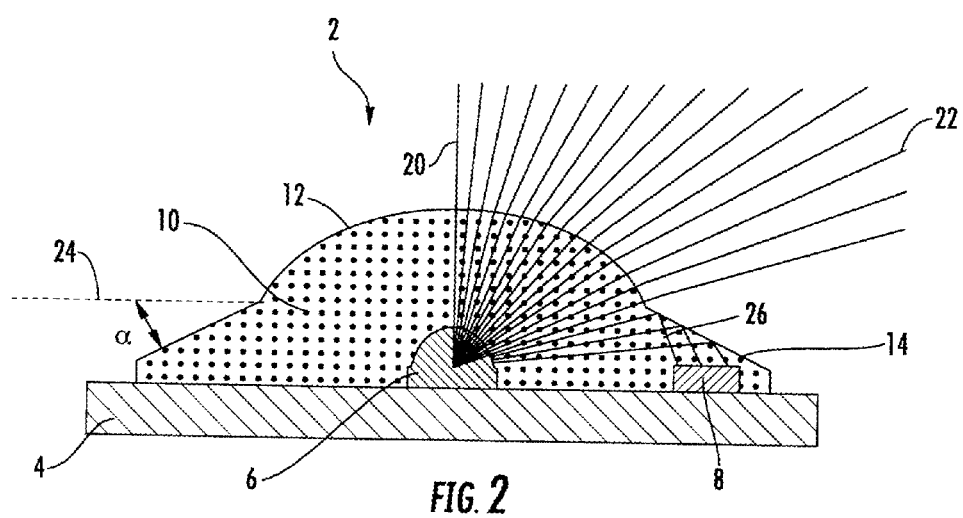
FIG. 2 shows a cross-sectional view through the exterior aircraft light unit of FIG. 1 in a first cross-sectional plane.

FIG. 2 shows a cross-sectional view through the exterior aircraft light unit 2 of FIG. 1 along a plane containing the axis A-A and being perpendicular to the support plate 4. The viewing direction of the cross-sectional view of FIG. 2 is in accordance with the arrows A in FIG. 1. The general structure of the exterior aircraft light unit 2 is not described again, and reference is made to above description of FIG. 1.

The transparent optical element 10 is shown as a dotted structure in FIG. 2, with the refractive outer surface portion 12 and the total internal reflection portions 14 forming the upper surface of the transparent optical element 10 in the viewing direction of FIG. 2. The lower surface of the transparent optical element 10 runs along the support plate 4 as well as along the outer contours of the LED 6 and the near end of life detector 8. The transparent optical element 10 is a solid structure that fills the entire space between the refractive outer surface portion 12 and the total internal reflection portions 14 on the one hand and the support plate 4, the LED 6, and the near end of life detector 8 on the other hand. In particular, no air gaps are present between the LED 6 and the transparent optical element 10 or between the near end of life detector 8 and the transparent optical element 10. The transparent optical element 10 encases the LED 6 and the near end of life detector 8 and fully surrounds the LED 6 as well as the near end of life detector 8. It also extends within the space between the LED 6 and the near end of life detector 8.

The optical behaviour of the exterior aircraft light unit 2 is described as follows. The LED 6 has a main light emission direction 20, substantially orthogonal to the support plate 4. The main light emission direction 20 corresponds to the facing direction of the LED 6, namely to the direction straight away from the support plate 4. This direction is referred to as the main light emission direction 20, because it is the direction of the highest light intensity in the output light intensity distribution of the LED 6. The refractive outer surface portion 12 refracts the light from the LED, emitted within an angular range of +/−72° with respect to the main light emission direction 20. The refraction action is illustrated by a plurality of exemplary light rays 22. In order not to overcrowd FIG. 2, the exemplary light rays 22 are shown for only the right half of the exterior aircraft light unit 2 in the viewing direction of FIG. 2. However, as the refractive outer surface portion 12 is symmetric with respect to the main light emission direction 20, it is apparent that corresponding light rays on the lift side are refracted in an analogous manner. The refractive outer surface portion 12 slightly narrows the light output from +/−72° to +/−70°. It also re-configures the angular distribution of the light, in order to meet a particular desired output light intensity distribution of the exemplary exterior aircraft light unit 2. The distribution between +70° and −70° in the output light intensity distribution of the exterior aircraft light unit 2 takes the fact into account that some aircraft tail navigation lights are required to have an opening angle of 140° in a horizontal plane. Accordingly, the exterior aircraft light unit of FIG. 1 is readily useable as a tail navigation light of an air plane.

A portion of the light leaving the LED 6 in an angular range of between −72° and −90° with respect to the main light emission direction 20 reaches the near end of life detector 8. In particular, all of the light in this angular range hits the total internal reflection portion 14, shown towards the right in the drawing plane of FIG. 2. All this light experiences total internal reflection at the total internal reflection portion 24, as is illustrated by exemplary light rays 26. The near end of life detector 8, which is a photodetector, collects a large portion of this light, with some of the light passing by the near end of life detector 8 due to its limited extensions. In this way, a portion of the light, emitted by the LED 6, reaches the near end of life detector 8 after travelling through the transparent optical element 10, while experiencing total internal reflection at the total internal reflection portion 14 along the way.

In the depicted exemplary embodiment, the total internal reflection portion 14 is a planar surface, as can also be seen in FIG. 1. The planar surface forms a linear contour in the cross-sectional view of FIG. 2. The transparent optical element 10 is symmetrical with respect to the main light emission direction 20, also with respect to the total internal reflection portion 14. Accordingly, a total internal reflection portion is provided on each of the left hand side and the right hand side of the transparent optical element 10 in the viewing direction of FIG. 2. As the near end of life detector 8 is provided on the right hand side of the transparent optical element 10 in the viewing direction of FIG. 2, the total internal reflection portion 14 on the left hand side of FIG. 2 could also be dispensed with.

In the cross-section depicted in FIG. 2, the total internal reflection portion 14 is inclined at an angle α with respect to the support plate 4. The angle α is indicated with respect to horizontal line 24, which is parallel to the support plate 4 and thus encloses the same angle with the total internal reflection portion 14. In the depicted exemplary embodiment, the angle α is about 26°. This angle is chosen in such a way that the light rays leaving the LED 6 within the angular ranges of −90° to −72° and 72° to 90° experience total internal reflection, while at the same time the lateral extension of the transparent optical element 10 is kept small. It is apparent that this angle may be adapted to the particular application scenario, depending on the required/desired output angle of the output light intensity distribution and depending on the refractive index of the material of the transparent optical element 10.

In the depicted exemplary embodiment, the near end of life detector 8 is a photo detector that senses the amount of light hitting a sensing surface of the near end of life detector 8. The near end of life detector 8 generates a signal indicative of the amount of light detected. In this way, the signal is indicative of the light output level of the LED 6. The signal may be a variable voltage signal or a PWM signal or any other suitable signal that can encode the detected light output level of the LED 6. In the depicted exemplary embodiment, this signal is provided to a control unit (not shown) of the exterior aircraft light unit 2. In the control unit, the detected light output level of the LED 6 is compared to a light output level threshold. If the detected light output level is below the light output level threshold, the light output of the LED 6 has decreased below a critical level. The control unit then generates an alarm signal, indicating that maintenance is required. The light output level threshold may be defined as a certain percentage of the light output level of the LED 6, when going into service. For example, it may be defined that the exterior aircraft light unit 2 requires maintenance if the detected light output level is below 60% of the initial light output level of the LED 6, i.e. below 60% of the light output level of the LED 6 at the beginning of the life time of the exterior aircraft light unit 2.

Figure 3:
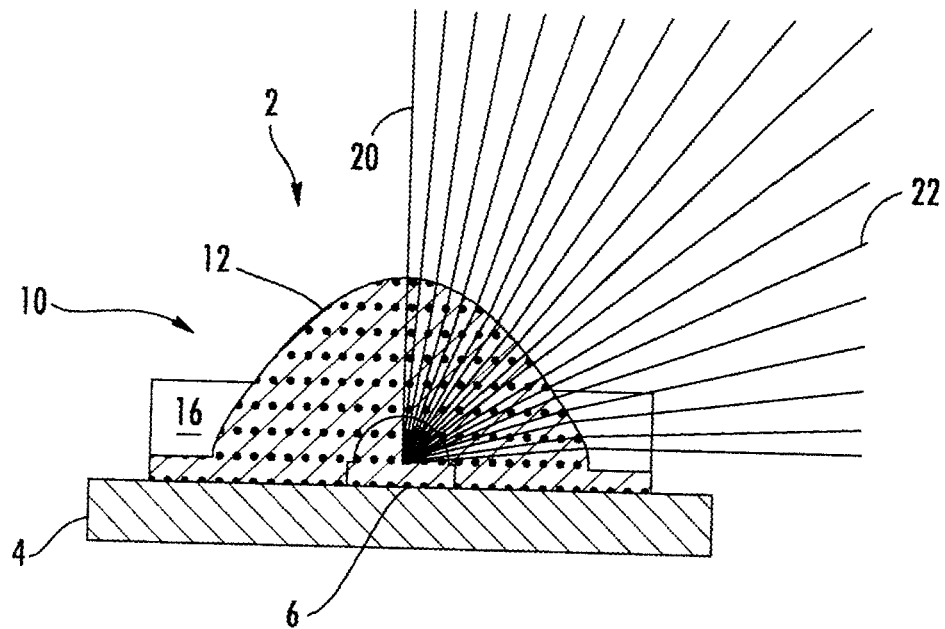
FIG. 3 shows a cross-sectional view through the exterior aircraft light unit of FIG. 1 in a second cross-sectional plane.

FIG. 3 shows a second cross-sectional view through the exterior aircraft light unit 2 of FIG. 1, namely a cross-sectional view along the axis B-B of FIG. 1 and perpendicular to the support plate 4. In the cross-sectional plane of FIG. 3, the refractive outer surface portion 12 of the transparent optical element 10 extends over the angular range from −90° to +90° with respect to the main light emission direction 20. Accordingly, all light emitted by the LED 6 in the cross-sectional plane of FIG. 3, is refracted and contributes to the output light intensity distribution of the exterior aircraft light unit 2. This is illustrated by exemplary light rays 22 on the right hand side of FIG. 3. The transparent optical element 10 is symmetric with respect to the main light emission direction 20 in the cross-sectional plane of FIG. 3, such that illustrative light rays on the left hand side of FIG. 3 would result in a corresponding, mirrored light path pattern.

The particular shape of the refractive outer surface portion 12 in the cross-sectional plane of FIG. 3 is adapted to produce an output light intensity distribution that satisfies the requirements for a tail navigation light unit in the vertical dimension. In particular, the light in an angular range of +/−15° with respect to the main light emission direction 20 is re-directed to an angular range of +/−10°. The light in the angular ranges of −45° to −15° and +15° to +45° is refracted into the angular ranges of −39° to −10° and +10° to +39°. The light in the angular ranges of −65° to −45° and +45° to +65° is refracted into the angular ranges of −70° to −39° and +39° to +70°. The light in the angular ranges of −90° to −65° and +65° to +90° is refracted into the angular ranges of −90° to −70° and +70° to +90°.

Figure 4:
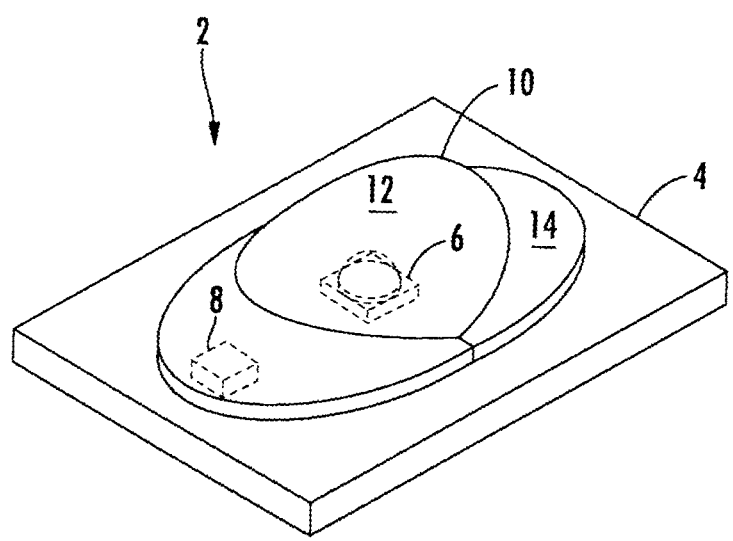
FIG. 4 shows an exterior aircraft light unit in accordance with another exemplary embodiment of the invention in a perspective view.

FIG. 4 shows an exterior aircraft light unit 2 in accordance with another exemplary embodiment of the invention in a perspective view. The support plate 4, the LED 6, and the near end of life detector 8 are identical to the corresponding elements in FIG. 1, and reference is made to above description thereof. The transparent optical element 10 of the exterior aircraft light unit 2 of FIG. 4 is similar to the transparent optical element 10 of FIG. 1. In particular, the refractive outer surface portion 12 of the transparent optical element 10 of FIG. 4 is identical in shape to the refractive outer surface portion 12 of the transparent optical element 10 of FIG. 1. However, the transparent optical element 10 of FIG. 4 does not comprise a combination of total internal reflection portions 14 and connection portions 16. Instead, the transparent optical element 10 of FIG. 4 comprises two total internal reflection portions 14 that jointly surround the refractive outer surface portion 12 in two hook-like shapes. The two total internal reflection portions 14 are slightly convex on their upper sides facing away from the support plate 4.

Figure 5:
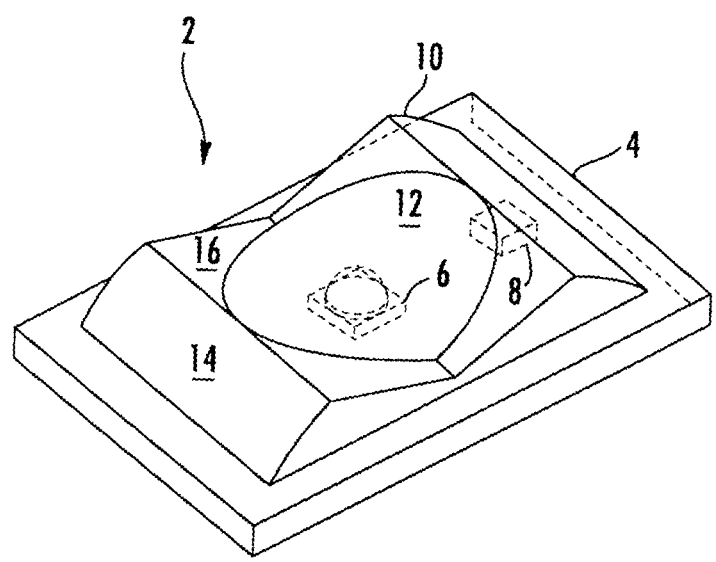
FIG. 5 shows an exterior aircraft light unit in accordance with yet another exemplary embodiment of the invention in a perspective view.

FIG. 5 shows an exterior aircraft light unit 2 in accordance with yet another exemplary embodiment of the invention in a perspective view. The exterior aircraft light unit 2 of FIG. 5 is identical to the exterior aircraft light unit 2 of FIG. 1, with the exception that the total internal reflection portions 14 are convex surfaces, forming convex lines in a cross-sectional plane running through the LED 6 and the near end of life detector 8 and being perpendicular to the support plate 4. This convex geometry of the total internal reflection portions 14 allows for a stronger concentration of the light, experiencing total internal reflection, towards the near end of life detector 8.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light unit, comprising
a support plate,
an LED, mounted to the support plate,
a near end of life detector for sensing a light output level of the LED, the near end of life detector being mounted to the support plate, and
a transparent optical element for shaping an output light intensity distribution of the exterior aircraft light unit, wherein the transparent optical element jointly encases the LED and the near end of life detector, with light from the LED reaching the near end of life detector through the transparent optical element;
wherein the transparent optical element is in direct contact with the LED and the near end of life detector, with the transparent optical element abutting the LED and the near end of life detector without an air gap;

wherein the transparent optical element has a refractive outer surface portion for shaping the output light intensity distribution of the exterior aircraft light unit, and wherein the transparent optical element has, at least in a first cross-sectional plane, a total internal reflection portion, which is an outer surface portion of the transparent optical element distinct from the refractive outer surface portion, with light from the LED reaching the near end of life detector via total internal reflection within the transparent optical element at the total internal reflection portion.

2. The exterior aircraft light unit according to claim 1, wherein the total internal reflection portion is a planar surface, forming a line in the first cross-sectional plane.

3. The exterior aircraft light unit according to claim 2, wherein the total internal reflection portion has an angle of between 10° and 30°, in particular of between 20° and 28°, with respect to the support plate in the first cross-sectional plane.

4. The exterior aircraft light unit according to claim 1, wherein the total internal reflection portion is a convex surface, when seen from outside the exterior aircraft light unit.

5. The exterior aircraft light unit according to claim 1, wherein the total internal reflection portion is located within an angular range of between 60° and 90°, in particular within an angular range of between 70° and 90°, with respect to a main light emission direction of the LED in the first cross-sectional plane, the main light emission direction of the LED being substantially orthogonal to the support plate.

6. The exterior aircraft light unit according to claim 1, wherein the first cross-sectional plane is a horizontal cross-sectional plane through the exterior aircraft light unit.

7. The exterior aircraft light unit according to claim 1, wherein the LED has a main light emission direction substantially orthogonal to the support plate.

8. The exterior aircraft light unit according to claim 1, wherein the transparent optical element solidly reaches to the support plate around the LED and around the near end of life detector.

9. The exterior aircraft light unit according to claim 1, wherein the transparent optical element is overmolded over the LED and the near end of life detector onto the support plate.

10. The exterior aircraft light unit according to claim 1, wherein the exterior aircraft light unit is free of shutters.

11. The exterior aircraft light unit according to claim 1, wherein the exterior aircraft light unit is one of a navigation light unit, an anti-collision light unit, and a beacon light unit.

12. An aircraft comprising at least one exterior aircraft light unit according to claim 1.

13. The aircraft of claim 12, wherein the exterior light unit in installed on a tail portion of the aircraft.

14. The exterior aircraft light unit according to claim 7, wherein the refractive outer surface portion extends, in a first cross-sectional plane, around the main light emission direction of the LED and is adjacent to at least one total internal reflection portion located on at least one side of the refractive outer surface portion.

15. The exterior aircraft light unit according to claim 7, wherein the refractive outer surface portion extends, in a second cross-sectional plane, in an angular range of between 80° to 80° with respect to the main light emission direction of the LED.

16. The exterior aircraft light unit according to claim 7, wherein the LED has a main light emission direction substantially orthogonal to the support plate, wherein the refractive outer surface portion extends, in a first cross-sectional plane, around the main light emission direction of the LED and is adjacent to at least one total internal reflection portion located on at least one side of the refractive outer surface portion, and wherein the refractive outer surface portion extends, in a second cross-sectional plane, in an angular range of between −80° to 80° with respect to the main light emission direction of the LED.

17. The exterior aircraft light unit according to claim 15, wherein the refractive outer surface portion extends, in a second cross-sectional plane, in an angular range of between −90° and 90° with respect to the main light emission direction of the LED.

18. The exterior aircraft light unit according to claim 16, wherein the refractive outer surface portion extends, in a second cross-sectional plane, in an angular range of between −90° and 90° with respect to the main light emission direction of the LED.

* * * * *